US010221867B2

(12) United States Patent
Hampton et al.

(10) Patent No.: US 10,221,867 B2
(45) Date of Patent: Mar. 5, 2019

(54) FLOW CONTROL FOR ASPIRATORS PRODUCING VACUUM USING THE VENTURI EFFECT

(71) Applicants: Keith Hampton, Ann Arbor, MI (US); David Fletcher, Flint, MI (US); Brian M. Graichen, Leonard, MI (US); Rex Bravo, Detroit, MI (US); James H. Miller, Ortonville, MI (US); Matt Gilmer, Whitmore Lake, MI (US); Andrew Niedert, New Hudson, MI (US)

(72) Inventors: Keith Hampton, Ann Arbor, MI (US); David Fletcher, Flint, MI (US); Brian M. Graichen, Leonard, MI (US); Rex Bravo, Detroit, MI (US); James H. Miller, Ortonville, MI (US); Matt Gilmer, Whitmore Lake, MI (US); Andrew Niedert, New Hudson, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 777 days.

(21) Appl. No.: 14/565,088

(22) Filed: Dec. 9, 2014

(65) Prior Publication Data

US 2015/0159677 A1   Jun. 11, 2015

Related U.S. Application Data

(60) Provisional application No. 61/914,061, filed on Dec. 10, 2013.

(51) Int. Cl.
*F04F 5/20* (2006.01)
*F16K 3/18* (2006.01)
(Continued)

(52) U.S. Cl.
CPC ............... *F04F 5/20* (2013.01); *F04F 5/461* (2013.01); *F04F 5/464* (2013.01); *F04F 5/466* (2013.01); *F04F 5/52* (2013.01); *F16K 3/18* (2013.01)

(58) Field of Classification Search
CPC ........ F04F 5/02; F04F 5/14; F04F 5/16; F04F 5/20; F04F 5/22; F16K 11/06;
(Continued)

(56) References Cited

U.S. PATENT DOCUMENTS

| 842,393 A | * | 1/1907 | De Ferranti | .......... F16K 27/062 137/533.19 |
| 2,204,142 A | | 6/1940 | MacClatchie | |

(Continued)

FOREIGN PATENT DOCUMENTS

| CA | 1063454 | 10/1975 |
| CN | 2085459 | 9/1991 |

(Continued)

OTHER PUBLICATIONS

PCT, International Search Report and Written Opinion, International Application No. US/2014/069461 (dated Mar. 4, 2015).

(Continued)

*Primary Examiner* — Kenneth J Hansen
*Assistant Examiner* — Chirag Jariwala
(74) *Attorney, Agent, or Firm* — FisherBroyles, LLP; Susan M. Oiler

(57) ABSTRACT

An aspirator for creating vacuum is disclosed that includes a housing defining a fluid passageway with a first tapering portion and a second tapering portion. Each tapering portion has a larger internal opening and a smaller internal opening, the smaller openings facing one another. The aspirator includes a gate positioned between and in fluid communication with the first and second tapering portions, the gate (Continued)

having a first Venturi tube with a Venturi opening creating vacuum when fluid flows in a direction and a second Venturi tube with a Venturi opening that creates vacuum when fluid flows in the opposite direction. The Venturi openings are in fluid communication with a suction port, and the first and second Venturi tubes may provide different mass flow rates through the aspirator. An engine system having an aspirator with a gate having a first bore and a second bore and an actuator is also disclosed.

11 Claims, 3 Drawing Sheets

(51) Int. Cl.
  *F04F 5/46* (2006.01)
  *F04F 5/52* (2006.01)
(58) Field of Classification Search
  CPC .... F16K 11/065; F16K 11/07; F16K 11/0716; F16K 15/18; F16K 3/18; Y10T 137/7771; Y10T 137/7779
  USPC ............... 417/183, 187, 190; 137/493, 493.8
  See application file for complete search history.

(56) References Cited

U.S. PATENT DOCUMENTS

| | | | |
|---|---|---|---|
| 2,306,490 A * | 12/1942 | Noble | F16K 3/186 |
| | | | 251/176 |
| 2,693,110 A * | 11/1954 | Terrell | G01F 1/44 |
| | | | 138/45 |
| 2,705,610 A | 4/1955 | Hjulian | |
| 2,740,962 A | 6/1956 | Kreichman et al. | |
| 2,750,962 A | 6/1956 | Kreichman et al. | |
| 2,816,730 A | 12/1957 | Rabas | |
| 2,835,468 A | 5/1958 | Sparks | |
| 2,913,220 A | 11/1959 | Cover | |
| 2,953,346 A | 9/1960 | Liecke et al. | |
| 3,069,131 A | 12/1962 | Grove | |
| 3,085,782 A * | 4/1963 | Grove | F16K 27/04 |
| | | | 251/124 |
| 3,113,757 A | 12/1963 | Nixon | |
| 3,203,447 A | 8/1965 | Bremner et al. | |
| 3,379,214 A | 4/1968 | Weinberg | |
| 3,478,771 A | 11/1969 | Johnson | |
| 3,534,307 A | 10/1970 | Spewock et al. | |
| 3,635,601 A | 1/1972 | Larson et al. | |
| 3,643,914 A * | 2/1972 | Bake | F16K 27/06 |
| | | | 251/124 |
| 3,666,231 A | 5/1972 | Parodi et al. | |
| 3,706,321 A | 12/1972 | Vicari | |
| 3,768,774 A | 10/1973 | Baugh | |
| 3,871,616 A | 3/1975 | Taylor | |
| 4,010,928 A | 3/1977 | Smith | |
| 4,013,090 A | 3/1977 | Taylor | |
| 4,056,255 A | 11/1977 | Lace | |
| 4,146,209 A | 3/1979 | Leva | |
| 4,157,169 A | 6/1979 | Norman | |
| 4,179,099 A | 12/1979 | Pierce, Jr. | |
| 4,210,308 A | 7/1980 | Sims | |
| 4,253,487 A | 3/1981 | Worley et al. | |
| 4,321,652 A | 3/1982 | Baker et al. | |
| 4,340,336 A | 7/1982 | Clary | |
| 4,341,369 A | 7/1982 | Meyer | |
| 4,385,280 A | 5/1983 | Reisem | |
| 4,446,887 A * | 5/1984 | Redmon | F16K 47/04 |
| | | | 137/556 |
| 4,535,967 A | 8/1985 | Babbitt et al. | |
| 4,568,058 A | 2/1986 | Shelton | |
| 4,585,207 A | 4/1986 | Shelton | |
| 4,638,193 A | 1/1987 | Jones | |
| 4,779,582 A | 10/1988 | Lequesne | |
| 4,809,742 A | 3/1989 | Grau | |
| 4,934,652 A | 6/1990 | Golden | |
| 5,000,215 A | 3/1991 | Phillips | |
| 5,020,774 A | 6/1991 | Christianson | |
| 5,059,813 A | 10/1991 | Shiroymama | |
| 5,172,658 A | 12/1992 | Hampton | |
| 5,195,722 A * | 3/1993 | Bedner | F16K 3/184 |
| | | | 251/196 |
| 5,234,088 A | 8/1993 | Hampton | |
| 5,235,941 A | 8/1993 | Hampton | |
| 5,377,955 A | 1/1995 | Baker | |
| 5,394,131 A | 2/1995 | Lungu | |
| 5,490,031 A | 2/1996 | Braun et al. | |
| 5,627,504 A | 5/1997 | Kleinhappl | |
| 5,685,519 A | 11/1997 | Bircann et al. | |
| 5,781,399 A | 7/1998 | Lanigan et al. | |
| 5,820,104 A | 10/1998 | Koyano et al. | |
| 5,909,525 A | 6/1999 | Miller et al. | |
| 5,982,605 A | 11/1999 | Massey et al. | |
| 6,057,750 A | 5/2000 | Sheng | |
| 6,158,718 A | 12/2000 | Lang et al. | |
| 6,164,322 A | 12/2000 | Najmolhoda et al. | |
| 6,199,587 B1 | 3/2001 | Shlomi et al. | |
| 6,337,612 B1 | 1/2002 | Kim et al. | |
| 6,357,721 B1 | 3/2002 | Maurer | |
| 6,425,410 B1 | 7/2002 | Taylor | |
| 6,442,955 B1 | 9/2002 | Oakner et al. | |
| 6,563,238 B1 | 5/2003 | Lee et al. | |
| 6,578,818 B1 | 6/2003 | Krimmer et al. | |
| 6,827,331 B1 | 12/2004 | Roos | |
| 7,017,886 B1 | 3/2006 | Ngene-Igwe | |
| 7,108,008 B2 | 9/2006 | Moreno | |
| 7,126,449 B2 | 10/2006 | Nickel et al. | |
| 7,523,916 B2 | 4/2009 | Fenton | |
| 7,849,674 B2 | 12/2010 | Masuda et al. | |
| 8,235,011 B2 | 8/2012 | Lengfeld et al. | |
| 8,561,392 B2 | 10/2013 | Ogunleye et al. | |
| 9,303,548 B2 * | 4/2016 | Fletcher | F01N 3/2066 |
| 9,435,300 B2 * | 9/2016 | Pursifull | F02M 35/10229 |
| 9,441,557 B2 * | 9/2016 | Pursifull | B60T 13/46 |
| 9,574,677 B2 | 2/2017 | Fletcher | |
| 9,841,110 B2 | 12/2017 | Fletcher et al. | |
| 9,845,899 B2 | 12/2017 | Graichen et al. | |
| 2002/0066877 A1 | 6/2002 | Nakagawa | |
| 2004/0113731 A1 | 6/2004 | Moyer et al. | |
| 2006/0016477 A1 | 1/2006 | Zaparackas | |
| 2006/0219302 A1 | 10/2006 | Knop | |
| 2007/0053133 A1 | 3/2007 | Evans | |
| 2007/0180816 A1 | 8/2007 | Masuda et al. | |
| 2007/0227478 A1 | 10/2007 | Fitzgerald | |
| 2008/0006791 A1 | 1/2008 | Reinicke | |
| 2008/0057848 A1 * | 3/2008 | Gray | B64D 41/00 |
| | | | 454/69 |
| 2008/0099090 A1 | 5/2008 | Cook | |
| 2008/0099710 A1 | 5/2008 | Jennings | |
| 2009/0020719 A1 | 1/2009 | Ishigaki | |
| 2009/0094009 A1 | 4/2009 | Muller | |
| 2011/0006240 A1 | 1/2011 | Williams et al. | |
| 2011/0132311 A1 * | 6/2011 | Pursifull | F02D 31/005 |
| | | | 123/184.56 |
| 2011/0196541 A1 | 8/2011 | Bauman et al. | |
| 2012/0161049 A1 | 6/2012 | Alvarez et al. | |
| 2012/0256111 A1 | 10/2012 | Hoang et al. | |
| 2012/0256113 A1 | 10/2012 | Comeaux | |
| 2012/0286182 A1 * | 11/2012 | Hoang | F16K 3/0254 |
| | | | 251/328 |
| 2012/0313023 A1 | 12/2012 | Brock | |
| 2013/0061949 A1 | 3/2013 | Minezawa et al. | |
| 2013/0062548 A1 | 3/2013 | Yokomi | |
| 2013/0340732 A1 | 12/2013 | Pursifull et al. | |
| 2014/0014080 A1 * | 1/2014 | Beshay | F01M 13/022 |
| | | | 123/574 |
| 2014/0353534 A1 | 12/2014 | Graichen et al. | |
| 2014/0360607 A1 * | 12/2014 | Fletcher | B60T 13/52 |
| | | | 137/888 |
| 2015/0060709 A1 | 3/2015 | Fletcher et al. | |
| 2015/0090355 A1 | 4/2015 | Fletcher et al. | |
| 2015/0128573 A1 | 5/2015 | Fletcher et al. | |
| 2015/0159677 A1 | 6/2015 | Hampton et al. | |

(56) References Cited

U.S. PATENT DOCUMENTS

| | | | |
|---|---|---|---|
| 2015/0162155 A1 | 6/2015 | Hampton et al. | |
| 2015/0354600 A1 | 12/2015 | Fletcher et al. | |
| 2016/0153472 A1 | 6/2016 | Fletcher et al. | |

FOREIGN PATENT DOCUMENTS

| | | |
|---|---|---|
| CN | 1205065 | 1/1999 |
| CN | 2480633 | 3/2002 |
| CN | 2534389 | 2/2003 |
| CN | 2791391 | 6/2006 |
| CN | 2934798 | 8/2007 |
| CN | 101036012 | 9/2007 |
| CN | 101772624 | 7/2010 |
| CN | 201679974 | 12/2010 |
| CN | 101963240 | 2/2011 |
| CN | 201866285 | 6/2011 |
| CN | 102996837 | 3/2013 |
| DE | 501 348 | 7/1930 |
| DE | 2714933 | 10/1978 |
| DE | 3209199 | 9/1983 |
| DE | 19727602 | 10/1998 |
| DE | 19841499 | 3/2000 |
| EP | 0 577 933 | 1/1994 |
| EP | 1333207 | 6/2003 |
| GB | 1411303 | 10/1975 |
| JP | S59-214280 | 12/1984 |
| JP | S61-180423 | 8/1986 |
| JP | H04-1412 Y2 | 1/1992 |
| JP | 3665674 | 6/2005 |
| WO | 95/29356 | 11/1995 |
| WO | 2001/014775 | 3/2001 |
| WO | 2009/045140 | 4/2009 |
| WO | 2012/100287 | 8/2012 |
| WO | 2013/049643 | 4/2013 |

OTHER PUBLICATIONS

PCT, International Search Report and Written Opinion, International Application No. US/2014/069528 (dated Mar. 10, 2015).
PCT, International Search Report and Written Opinion, International Application No. US/2014/069796 (dated Mar. 12, 2015).
U.S., Notice of Allowance; U.S. Appl. No. 14/539,656; (dated Dec. 15, 2015).
U.S., Non-Final Office Action, U.S. Appl. No. 14/277,815, (dated Jan. 15, 2016).
CN, Search Report; Patent Application No. 201480001143.2 (dated Jan. 22, 2016).
CN, Office Action; Patent Application No. 201480001143.2 (dated Feb. 3, 2016).
CN, Search Report; Patent Application No. 2014800021010 (dated Mar. 22, 2016).
CN, First Office Action; Patent Application No. 2014800021010 (dated Mar. 30, 2016).
CN, English Translation of First Office Action; Patent Application No. 2014800011432 (dated Feb. 3, 2016).
U.S., Non-Final Office Action; U.S. Appl. No. 14/473,151; (dated May 19, 2016).
U.S., Non-Final Office Action; U.S. Appl. No. 14/567,450; (dated May 19, 2016).
U.S., Non-Final Office Action; U.S. Appl. No. 14/565,814; (dated Jul. 21, 2016).
CN, Search Report with English translation; Patent Application No. 201480002102.5; (dated Jul. 26, 2016).
CN, Office Action with English translation; Patent Application No. 201480002102.5; (dated Aug. 3, 2016).
U.S., Final Office Action; U.S. Appl. No. 14/277,815; (dated Aug. 5, 2016).
CN, Office Action and Search Report with English translation; Patent Application No. 201410391935.7; (dated Sep. 2, 2016).
CN, Office Action and Search Report with English translation; Patent Application No. 201480002180.5; (dated Sep. 2, 2016).
U.S., Notice of Allowance; U.S. Appl. No. 14/567,450; (dated Oct. 11, 2016).
U.S., Advisory Action; U.S. Appl. No. 14/277,815; (dated Oct. 20, 2016).
U.S., Notice of Allowance; U.S. Appl. No. 14/818,851; (dated Nov. 3, 2016).
U.S., Notice of Allowance; U.S. Appl. No. 14/565,814; (dated Nov. 9, 2016).
U.S., Notice of Allowance; U.S. Appl. No. 14/277,815; (dated Dec. 5, 2016).
U.S., Notice of Allowance; U.S. Appl. No. 14/473,151; (dated Dec. 6, 2016).
PCT, International Search Report and Written Opinion, Patent Application No. PCT/US2016/045565; (dated Dec. 8, 2016).
EP, Supplementary European Search Report and Opinion, European Patent Application No. 14805033, 7 pages (dated Dec. 15, 2016.
CN, Search Report with English Translation, Chinse Patent Application No. 2014800620394, 4 pages (dated Dec. 13, 2016).
CN, Office Action with English Translation, Chinse Patent Application No. 2014800620394, 8 pages (dated Dec. 30, 2016).
U.S., Notice of Allowance, U.S. Appl. No. 14/565,814, 12 pages (dated Feb. 28, 2017).
U.S., Non-Final Office Action, U.S. Appl. No. 14/277,815, 16 pages (dated Mar. 23, 2017).
EP, Supplementary European Search Report; Patent Application No. 14840859.4; 7 pages, dated Mar. 22, 2017.
CN, Second Office Action and Search Report with English translation, Chinese Patent Application No. 2014103919357; 12 pages, dated Apr. 1, 2017.
U.S., Final Office Action, U.S. Appl. No. 14/473,151; 42 pages, dated Apr. 19, 2017.
PCT, International Search Report and Written Opinion, International Application No. US/2014/038018 (dated Nov. 26, 2014).
PCT, International Search Report and Written Opinion, International Application No. US/2014/053435 (dated Dec. 18, 2014).
PCT, International Search Report and Written Opinion, International Application No. US/2014/065252 (dated Feb. 19, 2015).
Office Action dated Aug. 21, 2017 in EP14805033.9 (6 pages).
CN, Notice of Allowance with English Translation; Chinese Application No. 20140391935.7 (dated Jul. 1, 2017).
EP, Supplemental Search Report; European Application No. 14869954.9 (dated Sep. 6, 2017).
EP, Second Office Action; European Application No. 14805033.9 (dated Feb. 13, 2018).
JP, Office Action; Japanese Application No. 2016-538555 ( dated Jan. 12, 2018).
JP, First Office Action with English Translation; Japanese Application No. 2016-516684 (dated Apr. 18, 2018).
U.S., Non Final Office Action; U.S. Appl. No. 15/820,840 (dated Jun. 29, 2018).
CN, First Office Action with English Translation; Chinese Application No. 201680044391.4 (dated Sep. 28, 2018).
CN; Search Report with English Translation; Chinese Application No. 201680044391.4 (dated Sep. 28, 2018).
JP, First Office Action; Japanese Application No. 2016-538071 (dated Nov. 15, 2018).

* cited by examiner

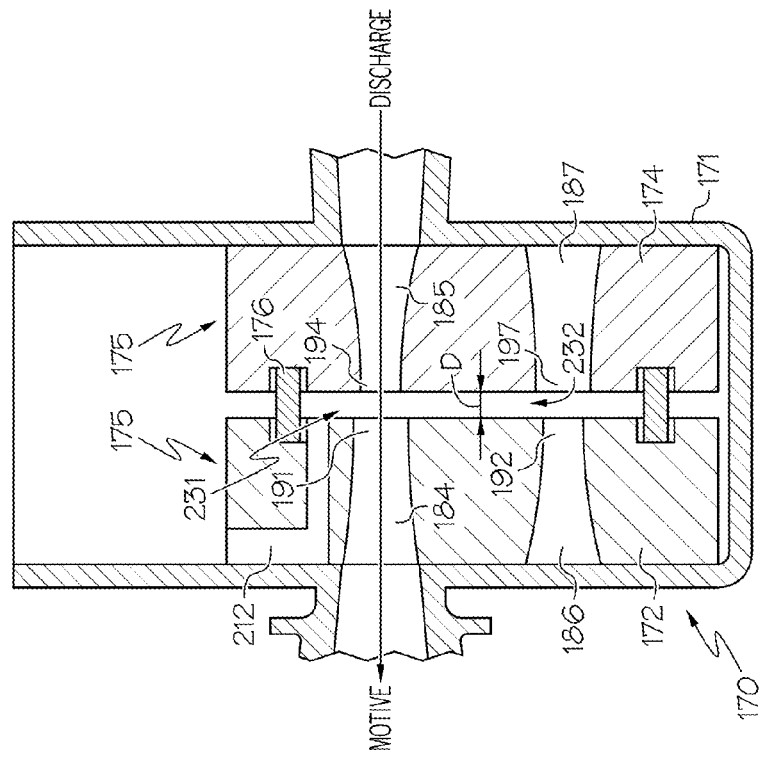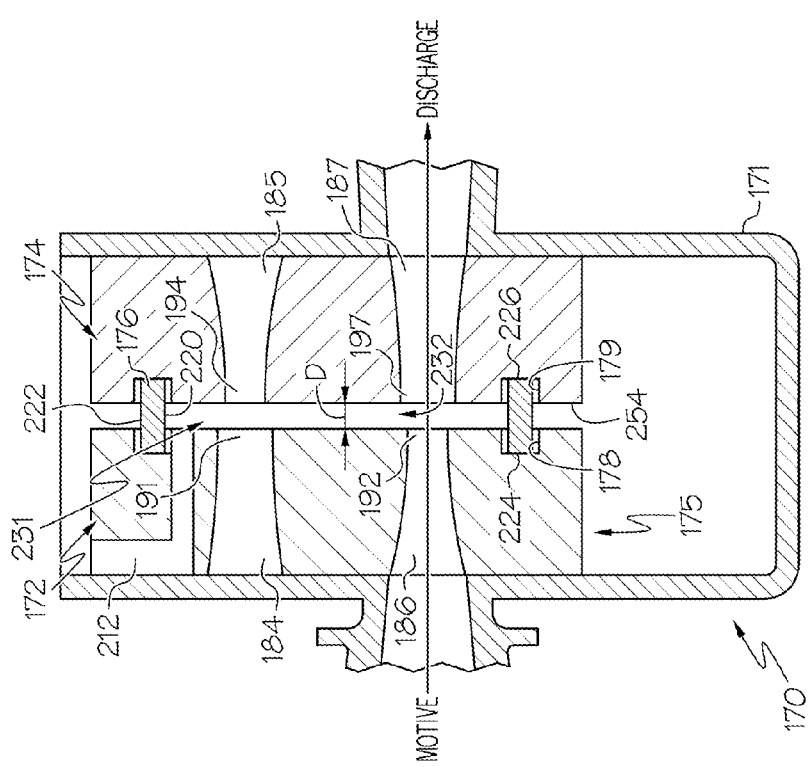

FLOW CONTROL FOR ASPIRATORS PRODUCING VACUUM USING THE VENTURI EFFECT

RELATED APPLICATIONS

This application claims the benefit of U.S. Provisional Application No. 61/914,061, filed on Dec. 10, 2013, which is incorporated by reference herein in its entirety.

TECHNICAL FIELD

This application relates to aspirators for producing vacuum using the Venturi effect, more particularly to such aspirators connected to an engine to provide control of the Venturi effect for different operating conditions of the engine.

BACKGROUND

Engines, for example vehicle engines, are being downsized and boosted, which is reducing the available vacuum from the engine. This vacuum has many potential uses, including use by the vehicle brake booster.

One solution to this vacuum shortfall is to install a vacuum pump. Vacuum pumps, however, have a significant cost and weight penalty to the engine, their electric power consumption can require additional alternator capacity, and their inefficiency can hinder fuel economy improvement actions.

Another solution is using aspirators that generate vacuum by creating an engine air flow path that is parallel to the throttle, referred to as an intake leak. This leak flow passes through a Venturi that generates a suction vacuum. The problem with presently available aspirators is that they are limited in the amount of vacuum mass flow rate they can generate and by the amount of engine air they consume.

A separate vacuum source may be required to operate vehicle systems while the engine is either under boost or operating with an inadequate amount of manifold vacuum. A need exists for improved designs that include fewer parts and/or fewer components to generate vacuum when supplied with boost and also when supplied with manifold vacuum.

SUMMARY

In one aspect, aspirators for creating vacuum are disclosed, in particular aspirators capable of providing flow control for the creation of vacuum under boost conditions and also under manifold vacuum in an engine and providing control of the mass flow rate through the aspirator. An aspirator can produce vacuum when supplied with either boost or manifold vacuum. To accomplish creating a vacuum with either boost or manifold vacuum, the application of the non-atmospheric pressure needs to switch from the discharge to the motive end of the aspirator, or separate aspirators must be plumbed with check valves to ensure proper operation, which is disclosed in Applicant's Provisional Application No. 61/914,724, filed on Dec. 11, 2013. In addition a separate shut off valve would be required to prevent flow in some situations.

The present disclosure is directed to an aspirator that can provide flow control for the creation of vacuum, including bi-directional flow control. The aspirators are connectable to a device in a vehicle that requires a vacuum, and the aspirators create vacuum for this device by the flow of air through a passageway extending generally the length of each aspirator and designed to create the Venturi effect as fluid flows from a motive port toward a discharge port of the aspirator and also to create the Venturi effect as fluid flows from the discharge port toward the motive port of the aspirator as controlled by an actuated gate assembly. The aspirators include a housing defining a fluid passageway having a first tapering portion gradually tapering from a larger internal opening to a smaller internal opening and a second tapering portion gradually tapering from a larger internal opening to a smaller internal opening that are positioned to converge toward one another with their smaller internal openings facing one another. The aspirators include a gate positioned between and in fluid communication with the first tapering portion and the second tapering portion to provide the flow control of the Venturi effect.

The gate includes a first Venturi tube having a Venturi opening in fluid communication with a suction port and a second Venturi tube having a Venturi opening in fluid communication with the suction port. The first Venturi tube creates a vacuum when fluid flows therethrough and the second Venturi tube creates a vacuum when fluid flows therethrough. Also, the gate may include a solid surface to block the flow of fluid between the first and second tapering portions. The aspirator includes an actuator connected to the gate to move the gate to place the first Venturi tube, the second Venturi tube, or the solid surface, as selected, into alignment with the smaller internal openings of the first and second tapering portions. In one embodiment, the housing can further include a gate housing portion that defines a gate passageway in which the gate is translatable.

In another aspect, the first Venturi tube creates a vacuum when fluid flows through the flow passageway from the first tapering portion to the second tapering portion, and the second Venturi tube creates a vacuum when fluid flows through the flow passageway from the second tapering portion to the first tapering portion.

In another aspect, the first Venturi tube in the gate assembly, when selected, creates a first mass flow rate through the aspirator, and the second Venturi opening, when selected, creates a second mass flow rate through the aspirator. In one embodiment, the second mass flow rate is different than the first mass flow rate. In another aspect, a direction of flow through the first Venturi tube and a direction of flow through the second Venturi tube are the same.

In another aspect, the gate can include a first gate member and a second gate member with a biasing member disposed therebetween to bias the first gate member and second gate member away from one another and into a sealed relationship with a gate housing portion of the housing enclosing the gate. The biasing member can be an endless elastic member or one or more springs. In another aspect, a biasing force of the endless elastic member creates a sealing relationship between the endless elastic member and the first gate member and between the endless elastic member and the second gate member.

In another aspect, the first Venturi tube includes a first gate upper bore having a first gate upper internal opening and a second gate upper bore having a second gate upper internal opening, and the second Venturi tube includes a first gate lower bore having a first gate lower internal opening and a second gate lower bore having a second gate lower internal opening. The second gate upper internal opening is larger than the first gate upper internal opening such that the first Venturi tube creates vacuum when fluid flows from the first gate upper bore, through a gap between the first gate and the second gate, and into the second gate upper bore; and wherein the second gate lower internal opening is smaller than the first gate lower internal opening such that the second Venturi tube creates vacuum when the fluid flows from the second gate lower bore, through the gap between the first gate and the second gate, and into the first gate lower bore.

In another aspect, the aspirator can include a bypass port intersecting the second tapering portion. In another aspect, the gate can include a suction vent therethrough that is in fluid communication with the suction port, the Venturi opening in the first Venturi tube, and the Venturi opening in the second Venturi tube.

In another aspect, an engine system is disclosed having an aspirator for creating vacuum, the aspirator having a motive port coupled to an air source and a discharge port coupled to an intake manifold of an engine. The aspirator can include a housing defining a fluid passageway therethrough, the fluid passageway having a first tapering portion gradually tapering from a larger internal opening to a smaller internal opening and a second tapering portion gradually tapering from a larger internal opening to a smaller internal opening, wherein the first tapering portion and the second tapering portion converge toward one another with their smaller internal openings facing one another. The aspirator includes a gate positioned between and in fluid communication with the first tapering portion and the second tapering portion of the housing. The gate has a first Venturi tube with a Venturi opening in fluid communication with a suction port and a second Venturi tube with a Venturi opening in fluid communication with the suction port. The first Venturi tube creates a vacuum when fluid flows therethrough, and the second Venturi opening creates a vacuum when fluid flows therethrough. The aspirator includes an actuator coupled to the gate and operable to move the gate to place the first Venturi tube, second Venturi tube, or a solid surface, as selected, into alignment with the smaller internal openings of the first and second tapering portions.

BRIEF DESCRIPTION OF THE DRAWINGS

FIG. 2 is a side, longitudinal cross-sectional plan view of the gate portion of the aspirator of FIG. 1 illustrating the gate in a first Venturi effect position.

FIG. 3 is a side, longitudinal cross-sectional plan view of the gate portion of the aspirator of FIG. 1 illustrating the gate in a second Venturi effect position.

DETAILED DESCRIPTION

Figure 1:
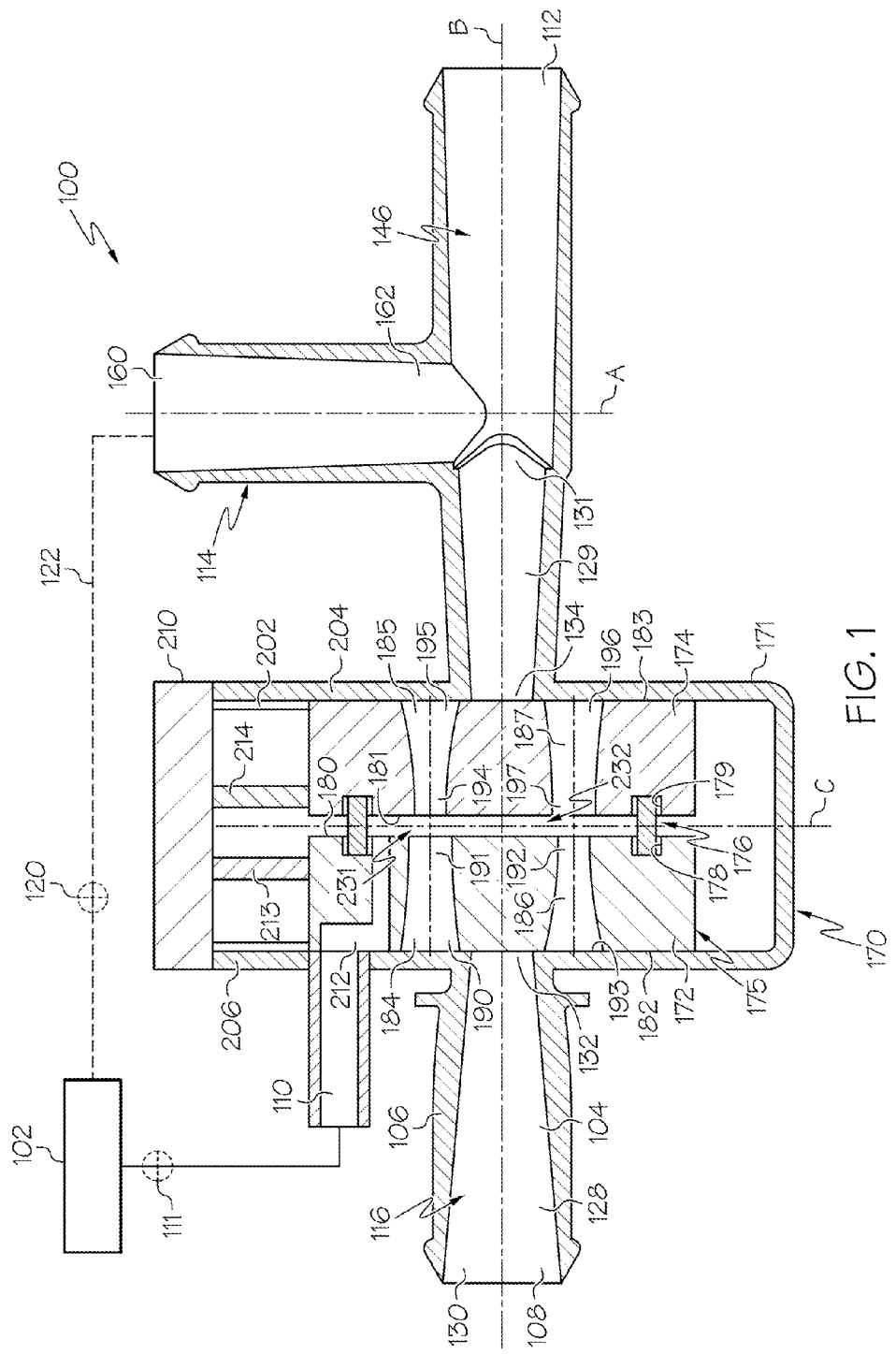
FIG. 1 is a side, longitudinal cross-sectional plan view of one embodiment of an aspirator having a gate providing bi-directional control of the Venturi effect therein.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Relative terms such as above, below, downward, upward, and the like are used for convenience with respect to the orientation of features depicted in the drawings to describe the relative positioning of various features in relationship to each other, and such terms should not be interpreted as limiting the invention to the depicted orientations.

FIG. 1 illustrates an embodiment of an aspirator 100 for use in an engine, for example, in a vehicle's engine. Aspirator 100 includes a body 106 defining passageway 104, having three or more ports that are connectable to an engine, and a gate assembly 170 providing control of the flow through passageway 104. As shown in FIG. 1, the ports include: (1) a motive port 108, which, in one embodiment, supplies clean air from the engine intake air cleaner, obtained upstream of the throttle of the engine; (2) a suction port 110, which can connect via an optional check valve 111 to a device requiring vacuum 102; (3) a discharge port 112, which, in one embodiment, is connected to an engine intake manifold downstream of the throttle of the engine; and, optionally, (4) a bypass port 114. In one embodiment, the device requiring vacuum 102 is a vehicle brake boost device. The device requiring vacuum 102 may also be a vacuum reservoir. The bypass port 114 may be connected to the device requiring vacuum 102 and, optionally, may include a check valve 120 in the fluid flow path 122 therebetween.

The passageway 104 of the aspirator 100 has a central longitudinal axis B labeled in FIG. 1. The passageway 104 includes a first tapering portion 128 in the motive section 116 of the body 106 coupled to a second tapering portion 129 in the discharge section 146 of the body 106. Here, the first tapering portion 128 and the second tapering portion 129 are aligned end to end (outlet end 132 of the motive section 116 to inlet end 134 of the discharge section 146) with the gate assembly 170 disposed therebetween to control the fluid communication between the motive section 116 and the discharge section 146. The inlet ends 130, 134 (or the outlet end 132, 131) may have a shape that is circular, elliptical, rectangular, or other polygonal shape and the gradually, continuously tapering inner passageway extending therefrom may define, but is not limited to, a hyperboloid or a cone.

The body 106, which may be referred to herein as a housing, includes a gate housing 171, which defines a gate passageway 202 having opposing walls 204, 206. The gate housing 171 may be referred to herein as a gate housing portion. A gate assembly 170 may be disposed within the gate housing 171 and may be translatable along the gate passageway 202. The gate passageway 202 may be generally perpendicular to the central longitudinal axis B of aspirator 100. The gate assembly 170, which may be referred to herein as a gate, includes a first bore and a second bore. The first bore, represented in FIG. 1 by the combination of upper bores 184, 185, has a Venturi opening 231 within a portion of the first bore that creates vacuum when fluid flows through the first bore. The upper bores 184, 185 make up a first Venturi tube that has a Venturi opening 231 in fluid communication with the suction port 110. The second bore, represented in FIG. 1 by the combination of lower bores 186, 187, has a Venturi opening 232 within a portion of the second bore that creates vacuum when fluid flows through the second bore. The lower bores 184, 185 make up a second Venturi tube that has a Venturi opening 232 in fluid communication with the suction port 110.

In one embodiment, the Venturi opening 231 in the first bore 184, 185 creates vacuum when fluid flows through the passageway 104 in a first direction, such as from the motive section 116 of aspirator 100 to the discharge section 146 of aspirator 100, for example, and the Venturi opening 232 in the second bore 186, 187 creates vacuum when fluid flows through the passageway 104 in a second direction opposite the first direction, such as from the discharge section 146 to the motive section 116 of aspirator 100, for example.

In one embodiment, the first bores 184, 185 may be sized to create a first mass flow of fluid through the aspirator 100, and the second bores 186, 187 may be sized to create a second mass flow of fluid through the aspirator 100 that is different than the first mass flow. The first mass flow and the second mass flow may be in the same direction through aspirator 100. The first mass flow and the second mass flow may be used to provide different mass flow rates through the aspirator 100. For example, the second bore 186, 187 may be sized smaller than the first bore 184, 185 to impede the mass flow of fluid/air through the aspirator and limit the mass flow rate of air to the engine intake manifold.

In one embodiment, the first bore 184, 185 and the second bore 186, 187 may be configured to produce different vacuum pressures. The first bore 184, 185 may taper such that the first bore 184, 185 creates a first speed of the fluid flowing past the Venturi opening 231, and the second bore 186, 187 may taper such that the second bore 186, 187 creates a second speed of the fluid flowing past the Venturi opening 232. The second speed may be different than the first speed, resulting in a different vacuum pressure than the vacuum pressure created at the Venturi opening 231 in the first bore 184, 185. The first bore 184, 185 may taper to a first narrowest cross-section (first profile) that creates a first fluid speed across the Venturi opening 231 in the first bore 184, 185, and the second bore 186, 187 may taper to a second narrowest cross-section (second profile) that creates a second fluid speed across the Venturi opening 232 in the second bore 186, 187. The gate assembly 170 may also have a solid surface, as shown in FIG. 1, that blocks fluid flow between the motive section 116 and the discharge section 146 of aspirator 100. The gate assembly 170 may be a single gate or multiple gate members seated in the gate passageway 202.

As seen in FIG. 1, the gate assembly 170, which may be referred to herein as a sprung gate, includes a first gate member 172, a second gate member 174, (collectively referred to as gate 175) and biasing members received therebetween. In one embodiment, the biasing member is an endless elastic band 176 as shown in FIG. 1. The endless elastic band 176 may be described as being sandwiched between the first and second gate members 172, 174. Examples of gate assemblies having two gate members with an endless elastic band disposed therebetween are described in Applicant's co-pending application Ser. No. 14/473,151, filed on Aug. 29, 2014, which is incorporated herein by reference in its entirety. Each gate member 172, 174 includes a track 178, 179 respectively as a portion of the surface facing the other gate member (herein referred to as the inner surfaces 180, 181). Each track 178, 179 has received therein (has seated therein) a portion of the endless elastic band 176. The endless elastic band 176 is a biasing member that biases the first and second gate members 172, 174 away from one another and as such biases their respective outer surfaces 182, 183 against opposing walls 204, 206 of the gate passageway 202 defined by the gate housing 171. The biasing force of the endless elastic band 176 may be a result of compression of the endless elastic band 176 between the first and the second gate members 172, 174.

Now referring to FIG. 2, the endless elastic band 176 may be generally oval-shaped and thereby includes an inner perimeter 220 defining an open space, an outer perimeter 222, and opposing first and second sides 224, 226. The endless elastic band 176 is received in the tracks 178, 179 of the first and second gate members 172, 174 with the first side 224 received in one track 178 and the second side 226 received in the other track 179. When the endless band 176 is seated in the tracks 178, 179, the first and the second gate members 172, 174 are spaced apart from one another by a distance D to define a gap. The gap enables fluid to flow against the endless elastic band 176, which is radially expandable, to expand the endless elastic band 176 radially outward to form a seal between the outer perimeter 222 of the endless elastic band 176 and a portion of the tracks 178, 179 in the first and second gate members 172, 174 as fluid flows through the gate 175 when it is in an open position, such as the first position illustrated in FIG. 2 and the second position illustrated in FIG. 3. This sealing engagement reduces or prevents fluid leakage into the actuator 210, which renders the gate 175 more leak resistant. The tracks 178, 179 are positioned to inset the endless elastic band 176 a distance from the outer perimeter of the first and second gate members 172, 174 as well. This construction defines a channel 254 around the outer perimeter 222 of the endless elastic band 176 between the first and second gate members 172, 174 for fluid flow around the sprung gate 170 within the gate passageway 202.

The endless elastic band 176 also results in a gate that is less sensitive to manufacturing tolerances, in particular with respect to the dimensions of gate passageway 202. The gate passageway 202 is typically formed to have a width that is smaller than the unloaded width of the gate 175. Accordingly, the endless elastic band 176 becomes compressed between the first and second gate members 172, 174 as the gate 175 is inserted into the gate passageway 202 (or pocket). The endless elastic band's biasing action on the first and second gate members 172, 174 when inserted (wedged) into the pocket 202 biases each respective gate member into a sealing engagement with a wall of the pocket to reduce or prevent leaks.

Figure 4:
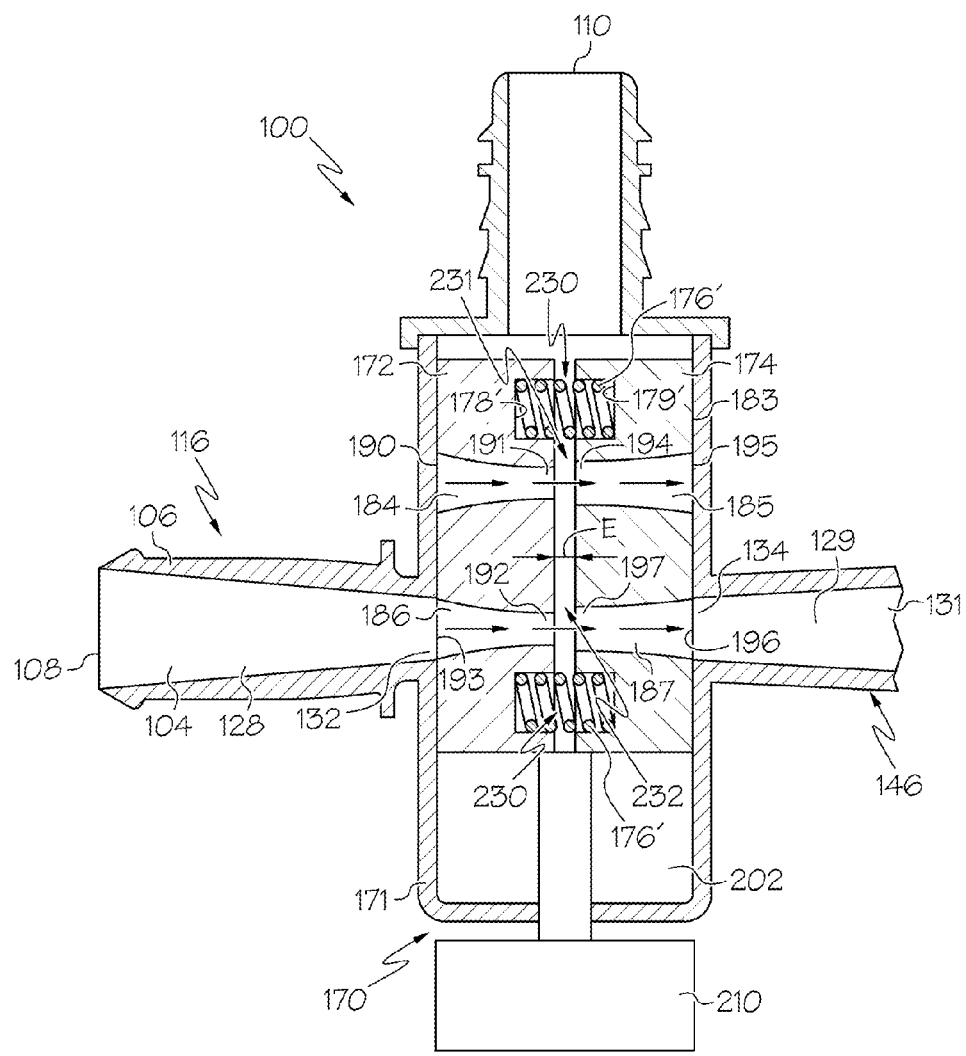
FIG. 4 is a side, longitudinal cross-sectional plan view of one embodiment of an aspirator having a gate providing flow control of the Venturi effect therein.

Referring now to FIG. 4, in another embodiment, the biasing members are one or more springs 176' sandwiched between the first and second gate members 172, 174. The springs 176' may be coil springs, leaf springs, torsion springs, other springs, or combinations thereof. Each gate member 172, 174 includes one or more partial bores 178', 179' respectively as a portion of the surface facing the other gate member (herein referred to as the inner surfaces 180, 181). Each partial bore 178', 179' has received therein (has seated therein) a portion of the springs 176'. The springs 176' bias the first and second gate members 172, 174 away from one another and as such biases their respective outer surfaces 182, 183 against opposing walls 204, 206 of the gate passageway 202 defined by the gate housing 171. The biasing force of the springs 176' may be a result of compression of the springs 176' between the first and the second gate members 172, 174. The springs 176' may have one or more spaces 230, that may be between individual coils of the springs 176' or may be between the springs 176' and the partial bores 178', 179' in the first and second gate members 172, 174.

As illustrated in FIGS. 1-3, each of the first and second gate members 172, 174 have an upper bore 184, 185 and a lower bore 186, 187. In another embodiment, the first and second gate members 172, 174 may have three bores therethrough. Referring back to FIGS. 1-3, the first gate member 172 includes an upper bore 184 and a lower bore 186 therethrough. The upper and lower bores 184, 186 (or alternatively first and second bores) are oriented to pass through the first gate member 172 generally horizontally as oriented relative to the page upon which the figures are printed and each has a central longitudinal axis generally parallel to the longitudinal axis B of passageway 104. The upper bore 184 has an outer opening 190 in the outer surface 182 and an inner opening 191 in the inner surface 180 of the first gate member 172. The outer surface 182 generally faces outwards toward the gate housing 171, and the inner surface 180 generally faces towards the inner surface 181 of the second gate member 174. The outer opening 190 is larger than the inner opening 191 and both openings may have a shape that is circular, elliptical, rectangular, or other polygonal shape with the bore gradually, continuously tapering as it extends between the outer opening 190 and the inner opening 191, which may define, but is not limited to, a hyperboloid or a cone. The lower bore 186 has an inner opening 192 in the inner surface 180 and an outer opening 193 in the outer surface 182 of the first gate member 172. Here, the inner opening 192 is smaller than the outer opening 193, and both openings may have a shape that is circular, elliptical, rectangular, or other polygonal shape with the bore gradually, continuously tapering as it extends between the inner opening 192 and the outer opening 193, which may define, but is not limited to, a hyperboloid or a cone.

The second gate member 174 includes an upper bore 185 and a lower bore 187 therethrough. The upper and lower bores 185, 187 are oriented to pass through the second gate member 174 horizontally as oriented relative to the page upon which the figures are printed and each has a central longitudinal axis generally parallel to the longitudinal axis B of passageway 104. The upper bore 185 has an inner opening 194 in the inner surface 181 and an outer opening 195 in the outer surface 183 of the second gate member 174. The outer surface 183 generally faces outward toward the gate housing 171, and the inner surface 181 generally faces toward the inner surface 180 of the first gate member. The inner opening 194 is smaller than the outer opening 195, and both openings may have a shape that is circular, elliptical, rectangular, or other polygonal shape with the bore gradually, continuously tapering as it extends between the inner opening 194 and the outer opening 195, which may define, but is not limited to, a hyperboloid or a cone. The lower bore 187 has an outer opening 196 in the outer surface 183 and an inner opening 197 in the inner surface 181 of the second gate member 174. Here, the outer opening 196 is larger than the inner opening 197, and both openings may have a shape that is circular, elliptical, rectangular, or other polygonal shape with the bore gradually, continuously tapering as it extends between the inner opening 192 and the outer opening 193, which may define, but is not limited to, a hyperboloid or a cone. The upper bore and lower bore of the gate assembly 175 may also be referred to herein as a first bore and a second bore in some embodiments without implying a spatial relationship between the first and second bores.

Referring to FIGS. 1-3, in operation, the gate assembly 170 is translatable generally perpendicular to the passageway 104. The translation of the gate 175 is enabled by an actuator 210 coupled to the first and second gate members 172, 174. The actuator 210 can be coupled directly to the first and second gate members 172, 174, as shown in FIG. 4, or can be coupled by a first connecting member 213 and/or a second connecting member 214, as shown in FIG. 1. The actuator 210 may be any device capable of moving the gate 175 between the various positions allowing flow within passageway 104 or blocking flow therein. In one embodiment, the actuator 210 may be a pneumatic actuator as disclosed in Applicant's co-pending U.S. application Ser. No. 14/277,815, filed on May 15, 2014, a solenoid actuator as disclosed in Applicant's co-pending U.S. application Ser. No. 14/473,151, filed on Aug. 29, 2014, or a rotary to linear actuator as disclosed in U.S. Published Application 2012/0256111, each of which is incorporated herein by reference in its entirety.

As illustrated in FIGS. 1-3, the gate 175 has at least three positions: (1) a blocked flow position shown in FIG. 1 where both the first gate member 172 and the second gate member 174 have a solid surface biased against the outlet end 132 of the motive section 116 and the inlet end 134 of the discharge section 146, respectively, of passageway 104; (2) a first flow position shown in FIG. 3 having the upper bores 184, 185 in the first and second gate members 172, 174 aligned with one another and aligned with passageway 104 allowing fluid to flow through the first Venturi tube; and (3) a second flow position shown in FIG. 2 having the lower bores 186, 187 in the first and the second gate members 172, 174 aligned with one another and aligned with passageway 104 allowing fluid to flow through the second Venturi tube. In one embodiment, the first flow position can be used to create vacuum for fluid flow in one direction, such as from the motive section 116 to the discharge section 146, for example, and the second flow position can be used to create vacuum for fluid flow in the opposite direction, such as from the discharge section 146 to the motive section 116. In one embodiment, the first flow position and the second flow position are used for fluid flow in the same direction but have different internal profiles to produce different mass flow rates.

In operation, the aspirator 100 creates a Venturi effect as fluid flows through either the upper bores 184, 185 or the lower bores 186, 187 of the gate assembly 175. In one embodiment, the upper bores 184, 185 create the Venturi effect for fluid flow in a first direction, and the lower bores 186, 187 create the Venturi effect for fluid flow in a second direction, which is opposite the first direction.

Now referring to FIG. 2, flow through the lower bores 186, 187 is for flow from the motive port 108 towards the discharge port 112. The first tapering portion 128 continuously tapers from a larger end 130 to the inner opening 192 of the lower bore 185 in the first gate member 172, which is smaller than the larger end 130 in the motive section 116. This change in cross-sectional profile along the first tapering portion 128 and the lower bore 186 causes the flow of fluid to increase speed as it passes therethrough. The larger end 130 and the inner opening 192 of the lower bore 186 of the first gate member 172 may have shapes that are circular, elliptical, rectangular, or other polygonal shape with the interior gradually, continuously tapering as it extends between the larger end 130 and the inner opening 192 of the lower bore 186, which may define, but is not limited to, a hyperboloid or a cone. The size of the inner opening 192 relative to the larger end 130 determines how much speed the motive air gains as it travels through the aspirator 100.

At the inner opening 192 in the lower bore 186 of the first gate member 172, fluid flow opens into the gap having distance D between the first and second gate members 172, 174 and then into the inner opening 197 of the lower bore 187 in the second gate member 174, which has a larger opening than the inner opening 192 of the lower bore 186 in the first gate member 172. Since the lower bores 186, 187 through the gate 175 have a change in profile at the inner surfaces 180, 181 of the first and second gate members 172, 174 at the gap therebetween, the gap constitutes a Venturi opening 232 that creates suction around it as fluid flows through the lower bores 186, 187 from the motive port 108 toward the discharge port 112. From the inner opening 197 of the lower bore 187 of the second gate member 174, the interior surface of the second tapering portion 129, including the lower bore 187 of the second gate member 174, tapers gradually and continuously to an even larger opening at the discharge port opening 131. The inner opening 197 and discharge port opening 131 may have shapes that are circular, elliptical, rectangular, or other polygonal shape with the interior surface gradually, continuously tapering as it extends between the inner opening 197 of the lower bore 187 of the second gate member 174 and the discharge port opening 131, which may define, but is not limited to, a hyperboloid or a cone. The lower bores 186, 187 make up the second Venturi tube. The suction generated at the Venturi opening 232 in the second Venturi tube is communicated to the suction port 110 through a vent 212 in the first gate member 172, to draw additional fluid from the suction port 110 into the lower bore 187 of the second gate member 174. While the vent 212 is illustrated as being in the first gate member 172, it may, conversely, be positioned in the second gate member 174.

Now referring to FIG. 3, flow through the upper bores 184, 185 is from the discharge port 112 toward the motive port 108, which is opposite the direction of flow for lower bores 186, 187. Here, the second tapering portion 129 continuously tapers from a larger end 131 to the inner opening 194 of the upper bore 185 in the second gate member 174, which has a smaller opening than the larger end 131 in the discharge section 146, as shown in FIGS. 1 and 3. This change in profile along the second tapering portion 129 and the upper bore 185 causes the flow of fluid to increase speed as it passes therethrough. The larger end 131 and the inner opening 194 of the upper bore 185 of the second gate member 174 may have shapes that are circular, elliptical, rectangular, or other polygonal shape with the interior profile gradually, continuously tapering therebetween, which may define, but is not limited to, a hyperboloid or a cone. The size of the inner opening 194 relative to the larger end 131 determines how much speed the motive air gains as it travels through the aspirator 100.

At the inner opening 194 in the upper bore 185 of the second gate member 174, fluid flow opens into the gap having distance D between the first and second gate members 172, 174 and then into the inner opening 191 of the upper bore 184 in the first gate member 172, which is larger than the inner opening 194 of the second gate member 174. Since the upper bores 184, 185 through the gate 175 have a change in profile/dimensions in the inner surfaces 180, 181 of the first and second gate members 172, 174, at the gap therebetween, the gap constitutes a Venturi opening 231 that creates suction around it as fluid flows through the upper bores 184, 185 from the discharge port 112 toward the motive port 108. From the inner opening 191 of the upper bore 184 of the first gate member 172, the inner profile of the first tapering portion 128, including the upper bore 184 of the first gate member 172, tapers gradually and continuously to an even larger opening at the motive port opening 130. The inner opening 191 of the upper bore 184 and the motive port opening 130 have shapes that are circular, elliptical, rectangular, or other polygonal shape, and the gradually, continuously tapering inner profile may define, but is not limited to, a hyperboloid or a cone. The upper bores 184, 185 make up the first Venturi tube. The suction generated at the Venturi opening 231 in the first Venturi tube is communicated to the a suction port 110 through a vent 212 in the first gate member 172, to draw additional fluid from the suction port 110 into the upper bore 184 of the first gate member 172. While the lower bores 186, 187 are configured to create the Venturi effect for fluid flow from the motive section 116 to the discharge section 146 and the uppers bores 184, 185 are configured for flow in the opposite direction, the directions of flow may, conversely, be switched such that the upper bores 184, 185 create the Venturi effect for fluid flowing from the motive section 116 to the discharge section 146 and the lower bores 186, 187 are configured for flow in the opposite direction.

In the embodiment of FIG. 4, fluid flow through the upper bores 184, 185 and the lower bores 186, 187 is in the same direction, such as from the motive section 116 to the discharge section 146, for example. The lower bores 186, 187 can have shapes and dimensions different from the upper bores 184, 185 such that the lower bores 186, 187 create a different mass flow rate and/or vacuum effect at the Venturi opening 232 than the mass flow rate and/or vacuum effect created by the Venturi opening 231 in the upper bore 184, 185.

Referring to FIG. 4, the upper bores 184, 185 and the lower bores 186, 187 of the gate assembly 175 may be configured to create vacuum for fluid flow from the motive section 116 to the discharge section 146. The upper bores 184, 185 are configured to create a first suction (vacuum pressure) and/or a first mass flow rate at the Venturi opening 231 in the upper bores 184, 185. The upper bores 184, 185 make up the first Venturi tube having the Venturi opening 231. When the gate assembly 175 is positioned to place the upper bores 184, 185 in passageway 104 (FIG. 4 shows the lower bores 186, 187 rather than the upper bores 184, 185 being aligned with the passageway 104), the tapering portion 128 continuously tapers from a larger end 130 to the inner opening 191 of the upper bore 184 in the first gate member 172, which has a smaller profile than the larger end 130 in the motive section 116. This change in profile along the tapering portion 128 and the upper bore 184 causes the flow of fluid to increase speed as it passes therethrough. The respective dimensions of the larger end 130 and the inner opening 191 of the upper bore 184 of the first gate member 172 determine how much speed the motive air (fluid) gains as it travels through the aspirator 100. At the inner opening 191 in the upper bore 184 of the second gate member 172, fluid flow opens into the gap having distance D between the first and second gate members 172, 174 and then into the inner opening 194 of the upper bore 185 in the second gate member 174, which has a larger profile than the inner opening 191 of the first gate member 172. Since the upper bores 184, 185 through the gate 175 have a change in profile in the inner surfaces 180, 181 of the first and second gate members 172, 174 at the gap therebetween, the gap constitutes the Venturi opening 231 that creates suction around it as fluid flows through the upper bores 184, 185 from the motive port 108 to the discharge port 112.

The differences in cross-sectional geometry (profile) and/or dimensions between the inner opening 191 of the upper bore 184 of the first gate member 172 and the inner opening 194 of the upper bore 185 of the second gate member 174 determine a magnitude of the Venturi effect created by the upper bores 184, 185, resulting in a first suction. The dimensions and/or cross-sectional geometry of the upper bores 184, 185 can also determine a first mass flow rate through the aspirator 100.

As shown in FIG. 4, the gate assembly 175 is positioned to place the lower bores 186, 187 in the passageway 104 to create a second suction (vacuum pressure) and/or a second mass flow rate at the Venturi opening 232 in the lower bores 186, 187. The lower bores 186, 187 make up the second Venturi tube having the Venturi opening 232. Here, the tapering portion 128 continuously tapers from a larger inlet end 130 at the motive port 108 to the inner opening 192 of the lower bore 186 in the first gate member 172, which has a smaller profile than the inlet end 130. This change in profile along the motive section 116 of the passageway 104 and the lower bore 186 of the first gate member 172 causes the flow of fluid to increase speed as it passes therethrough. The respective profiles of the inlet end 130 and the inner opening 192 determine how much speed the motive air (fluid) gains as it travels through the aspirator 100 and can affect the mass flow rate of fluid through the aspirator 100.

At the inner opening 192 of the lower bore 186 of the first gate member 172, fluid flow opens into the gap having distance D between the first and second gate members 172, 174 and then into the inner opening 197 of the lower bore 187 of the second gate member 174, which is larger than the inner opening 192 of the lower bore 186 of the first gate member 172. Since the lower bores 186, 187 through the gate 175 have a change in profile in the inner surfaces 180, 181 of the first and second gate members 172, 174, at the gap therebetween, the gap constitutes the Venturi opening 232 that creates suction around it as fluid flows through the lower bores 186, 187 from the motive port 108 toward the discharge port 112.

The differences in cross-sectional geometry (profile) and/or dimensions between the inner opening 192 in the lower bore 186 of the first gate member 172 and the inner opening 197 of the lower bore 187 of the second gate member 174 determine the magnitude of the Venturi effect created by the lower bores 186, 187, resulting in a second suction. The cross-sectional geometry and/or dimensions of the lower bores 186, 187 can also determine a second mass flow rate through the aspirator 100.

Differences in cross-sectional geometries (profiles) and/or dimensions between the upper bores 184, 185 and the lower bores 186, 187 can result in the first suction being different than the second suction. The aforementioned embodiments can supply different vacuum pressures in response to different operating requirements of the engine system employing the aspirator 100. The differences in geometries (profiles) and/or dimensions between the upper bores 184, 185 and the lower bores 186, 187 can also result in the first mass flow rate of fluid through the aspirator 100 being different that the second mass flow rate of fluid through the aspirator 100, which may, among other benefits, provide for controlling the mass flow rate of air to the engine intake manifold without the need for an additional flow control valves.

Referring to FIG. 4, the springs 176' bias the first and second gate members 172, 174 apart to form a gap E between the first and second gate members 172, 174. The springs 176' have one or more spaces 230 that allow fluid to pass by the springs 176' without the need for a vent 212 (shown in FIGS. 1-3) positioned in either of the first or second gate members 172, 174. The spaces 230 may be between coils of the spring 176' and/or may be between the spring 176' and the partial bores 178', 179' in the first gate member 172 and second gate member 174. Referring back to FIG. 4, the vacuum created at either the upper bores 184, 185 or the lower bores 186, 187 in the gate assembly 175 is communicated to the gap E, which is in fluid communication with the suction port 110 through the spaces 230 in the springs 176' or spaces between the springs 176' and the first and second gate members 172, 174. The fluid communication between the passageway 104 and the suction port 110 draws additional fluid from the suction port into the upper bore 185 or lower bore 187 of the second gate member 174.

The optional bypass port 114 of the aspirator 100 may intersect the discharge section 146 as described above to be in fluid communication with the second tapering section 129. As illustrated in FIG. 1, the bypass port 114 may intersect the second tapering section 129 adjacent to, but downstream of the outlet end 131. The body 106 may thereafter (i.e., downstream of this intersection of the bypass port) continue with a cylindrically uniform inner diameter until it terminates at the discharge port 112 or may be a tapering bore having a gradually, continuously tapering interior surface from the outlet end 131 of the second tapering section 129 to the port 112. A tapering bore in this section of body 106 can improve performance of the bypass port 114. Each of the respective ports 108, 110, 112, and 114 may include a connector feature on the outer surface thereof for connecting the aspirator 100 to hoses or other features in the engine. In the embodiment of FIG. 1, the gate passageway 202 has a central longitudinal axis C generally perpendicular to the body's central longitudinal axis B, and the optional bypass port 114 may likewise have a central longitudinal axis A that is generally perpendicular to the body's central longitudinal axis B.

The presently disclosed aspirators 100 having actuated gate assemblies 170 enables creation of vacuum with fluid flowing in either direction through the aspirator 100, whether the engine is under boost or operating with an inadequate amount of manifold vacuum. By doing so, the aspirators 100 may reduce the number and cost of components needed to supply an engine system's vacuum requirements, which is likely to reduce costs and increase the efficiency of engine systems, among other benefits. Additionally, the aspirators 100 enable control of the mass flow rate of fluid through the aspirator 100 and into the engine intake manifold, which is likely to reduce the costs of controlling air flow to the engine intake manifold, among other benefits.

What is claimed is:

1. An aspirator for creating vacuum comprising:
    a housing defining a fluid passageway therethrough, the fluid passageway comprising:
        a first tapering portion gradually tapering from a larger internal opening to a smaller internal opening; and
        a second tapering portion gradually tapering from a larger internal opening to a smaller internal opening;
        wherein the first tapering portion and the second tapering portion converge toward one another with their smaller internal openings facing one another and define a pocket therebetween;
    a gate positioned in the pocket in fluid communication with the first tapering portion and the second tapering portion of the housing, the gate having a first Venturi tube with a Venturi opening in fluid communication with a suction port and a second Venturi tube with a Venturi opening in fluid communication with the suction port, wherein the first Venturi tube creates a vacuum when fluid flows therethrough from the first tapering portion to the second tapering portion, wherein the second Venturi tube creates a vacuum when fluid flows therethrough in the opposing direction, from the second tapering portion to the first tapering portion; and
    an actuator coupled to the gate, the actuator operable to move the gate to place the first Venturi tube or the second Venturi tube, as selected, into alignment with the smaller internal openings of the first and second tapering portions;
    wherein the gate comprises a first gate member and a second gate member with an endless elastic band seated between and biasing the first gate member and second gate member away from one another into engagement with the pocket, the endless elastic band is seated inset a distance from an outer perimeter of the first and second gate members to define a channel around an outer perimeter of the endless elastic band between the first and second gate members for fluid flow around the gate within the pocket and spaces the first and second gate members apart from one another a distance to define a gap therebetween, wherein the first Venturi tube and the second Venturi tube are within the inner perimeter of the endless elastic band.

2. The aspirator of claim 1, wherein the gate further comprises a solid surface to block flow of fluid between the first and second tapering portions, and wherein the actuator is further operable to place the solid surface, the first Venturi tube, or the second Venturi tube, as selected, into alignment with the smaller internal openings of the first and second tapering portions.

3. The aspirator of claim 1, wherein the first Venturi tube comprises a first gate upper bore having a first gate upper inner opening and a second gate upper bore having a second gate upper inner opening; wherein the second Venturi tube comprises a first gate lower bore having a first gate lower inner opening and a second gate lower bore having a second gate lower inner opening; wherein the second gate upper inner opening is larger than the first gate upper inner opening such that the first Venturi tube creates vacuum when fluid flows from the first gate upper bore, through a gap between the first gate and the second gate, and into the second gate upper bore; and wherein the second gate lower inner opening is smaller than the first gate lower inner opening such that the second Venturi tube creates vacuum when fluid flows from the second gate lower bore, through the gap between the first gate and second gate, and into the first gate lower bore.

4. The aspirator of claim 1, wherein the first Venturi tube, when selected, creates a first mass flow rate through the aspirator, and the second Venturi tube, when selected, creates a second mass flow rate through the aspirator, wherein the second mass flow rate is different than the first mass flow rate.

5. The aspirator of claim 1, further comprising a bypass port intersecting the second tapering portion.

6. The aspirator of claim 1, wherein a biasing force of the endless elastic member creates a sealing relationship between the endless elastic member and the first gate member and between the endless elastic member and the second gate member.

7. The aspirator of claim 6, wherein the gate comprises a suction vent in fluid communication with the suction port, the Venturi opening in the first Venturi tube, and the Venturi opening in the second Venturi tube.

8. An engine system having an aspirator for creating vacuum, the system comprising:
the aspirator of claim 1, wherein a motive port of the aspirator is coupled to an air source and a discharge port is coupled to an intake manifold of an engine.

9. The engine system of claim 8, wherein the gate further comprises a solid surface to block the flow of fluid between the first and second tapering portions, and wherein the actuator is further operable to place the solid surface, the first Venturi tube, or the second Venturi tube, as selected into alignment with the smaller internal openings of the first and second tapering portions.

10. The engine system of claim 8, wherein the first Venturi tube, when selected, creates a first mass flow rate through the aspirator, and the second Venturi tube, when selected, creates a second mass flow rate through the aspirator, wherein the second mass flow rate is different than the first mass flow rate.

11. The engine system of claim 8, wherein the suction port is coupled to a device requiring vacuum for fluid communication therebetween.

* * * * *